(12) United States Patent
Locher et al.

(10) Patent No.: US 12,188,585 B2
(45) Date of Patent: Jan. 7, 2025

(54) DEVICE FOR TRANSFERRING EXHAUST GAS BETWEEN A FRONT AND REAR CARRIAGE OF A MOBILE WORKING MACHINE SEPARATED BY AN ARTICULATED PIVOT JOINT

(71) Applicant: Liebherr-Hydraulikbagger GmbH, Kirchdorf/Iller (DE)

(72) Inventors: Thomas Locher, Burgrieden (DE); Fabian Göggel, Langenenslingen (DE)

(73) Assignee: LIEBHERR-HYDRAULIKBAGGER GMBH, Kirchdorf/Iller (DE)

( * ) Notice: Subject to any disclaimer, the term of this patent is extended or adjusted under 35 U.S.C. 154(b) by 0 days.

(21) Appl. No.: 18/484,229

(22) Filed: Oct. 10, 2023

(65) Prior Publication Data

US 2024/0117907 A1    Apr. 11, 2024

(30) Foreign Application Priority Data

Oct. 11, 2022   (DE) ..................... 10 2022 126 255.3

(51) Int. Cl.
*F16L 27/10*    (2006.01)
*F16L 27/02*    (2006.01)
*F16L 27/08*    (2006.01)

(52) U.S. Cl.
CPC ......... *F16L 27/1004* (2013.01); *F16L 27/023* (2013.01); *F16L 27/0861* (2013.01)

(58) Field of Classification Search
CPC . F16L 27/1004; F16L 27/023; F16L 27/0861; F16L 27/0849; F16L 27/0865; F16L 27/107; F16L 37/244; F16L 27/12; F01N 13/1811; F01N 13/1816; F01N 13/1822
See application file for complete search history.

(56) References Cited

U.S. PATENT DOCUMENTS

| | | | |
|---|---|---|---|
| 3,466,093 A | 9/1969 | Landeborg et al. | |
| 3,649,052 A | * 3/1972 | Snyder, Jr. | ......... F16L 27/0816 285/38 |
| 3,664,706 A | 5/1972 | Chant | |

(Continued)

FOREIGN PATENT DOCUMENTS

| CN | 107351647 A | 11/2017 |
|---|---|---|
| DE | 8906913 U1 | 11/1989 |

(Continued)

*Primary Examiner* — James M Hewitt, II
(74) *Attorney, Agent, or Firm* — McCoy Russell LLP

(57) ABSTRACT

The present invention relates to a device for transferring exhaust gas between a front and rear carriage of a mobile working machine, in particular a dump truck, separated by an articulated pivot joint, which working machine has a pipe section, which is variable in it length, for conducting exhaust gas, a first flexible hose cooperating with a first end portion of the pipe section for introducing exhaust gas into the pipe section, and a second flexible hose cooperating with a second end portion of the pipe section for discharging exhaust gas from the pipe section. The device is characterized in that a first cardan shaft is provided in the first end portion, the distal end of which is configured to be rigidly attached to a fastening section of the front carriage or the rear carriage of the working machine, and a second cardan shaft is provided in the second end region.

14 Claims, 6 Drawing Sheets

(56) References Cited

U.S. PATENT DOCUMENTS

Figure 1:
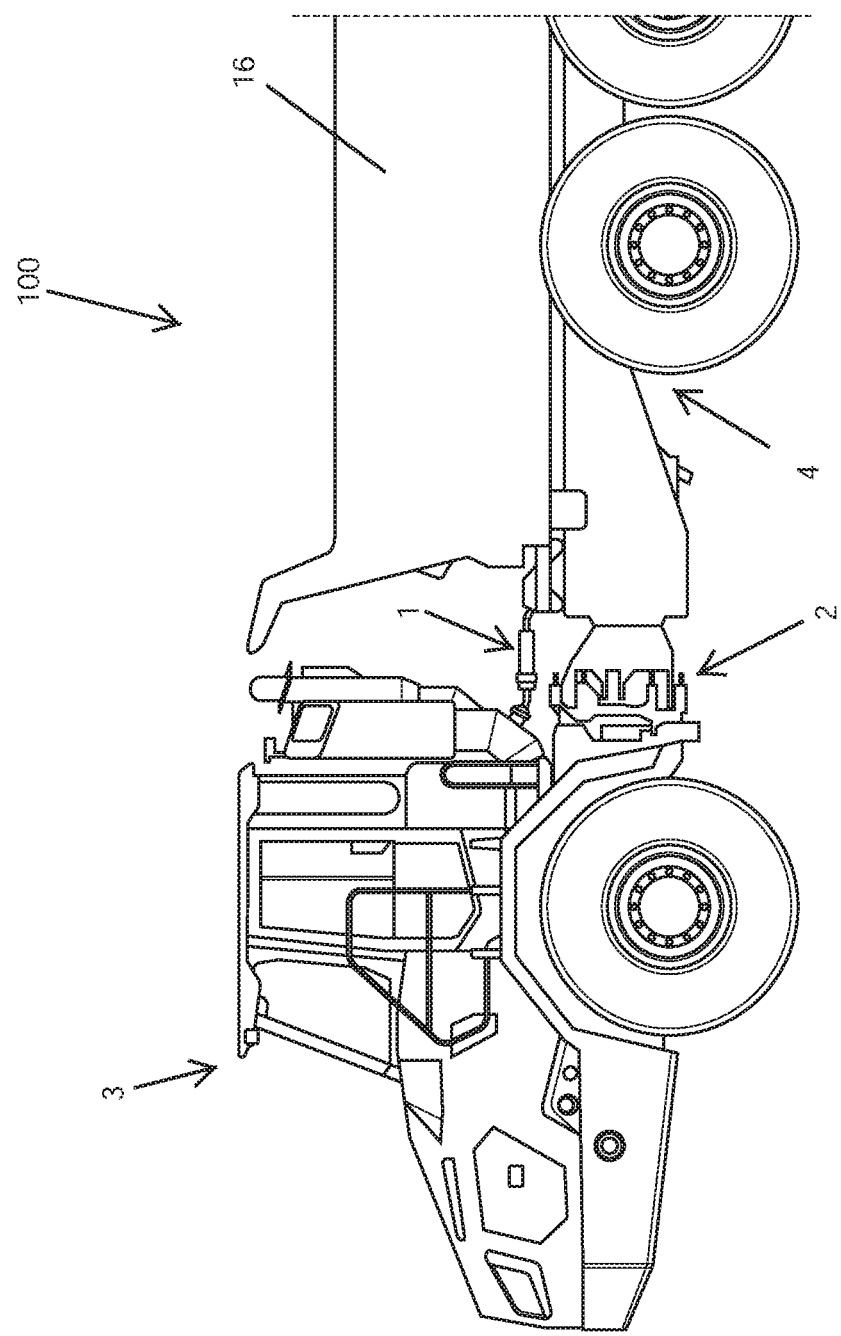

| | | | | |
|---|---|---|---|---|
| 3,841,357 | A | * | 10/1974 | Heijst ................. F16L 27/0861 138/120 |
| 3,845,975 | A | * | 11/1974 | Van Heijst .............. F16L 23/02 285/283 |
| 3,869,151 | A | | 3/1975 | Fletcher et al. |
| 3,997,194 | A | * | 12/1976 | Eifer ....................... F16L 51/02 285/226 |
| 4,123,860 | A | * | 11/1978 | De Koning ............ F16L 39/04 285/227 |
| 5,622,311 | A | | 4/1997 | Huston et al. |
| 2010/0084857 | A1 | * | 4/2010 | Hurskainen ............ F16L 27/04 285/94 |

FOREIGN PATENT DOCUMENTS

| | | |
|---|---|---|
| DE | 202010002274 U1 | 5/2010 |
| EP | 2366931 B1 | 9/2014 |
| JP | S582118 U | 1/1983 |
| RU | 99759 U1 | 11/2010 |
| WO | 2015152791 A1 | 10/2015 |

\* cited by examiner

DEVICE FOR TRANSFERRING EXHAUST GAS BETWEEN A FRONT AND REAR CARRIAGE OF A MOBILE WORKING MACHINE SEPARATED BY AN ARTICULATED PIVOT JOINT

The present invention relates to a device for transferring exhaust gas between a front and rear carriage of a mobile working machine separated by an articulated pivot joint or a construction machine of the dump truck type.

For certain working applications, it is advantageous for mobile working machines to consist of a front carriage and a rear carriage that are connected to each other by an articulated pivot joint. Such a configuration is used, for example, for dump trucks in which the driver's cab with the drive motor of the mobile working machine is arranged on the front carriage and the truck bed for picking up a working load is arranged on the rear carriage. The steering of such a mobile working machine may then comprise articulated steering, which produces a change in direction of the mobile working machine by deflecting the front carriage relative to the rear carriage using the articulated pivot joint.

The connection of the front carriage to the rear carriage via the articulated pivot joint enables independent movements of the front and rear carriage and thus allows particular mobility and maneuverability of the working machine.

The problem with mobile working machines known from the prior art with an articulated pivot joint is that the drive motor is located either on the front or rear carriage and the waste heat therefrom is often also used on the other carriage section where the drive motor is not located.

In a dump truck, for example, the waste heat from the drive motor is used to heat a truck bed so that components of the transported working load do not freeze to the truck bed at temperatures below freezing point. It is possible that moist earth placed in the truck bed freezes on the truck bed, so that the truck bed is not completely emptied during the unloading process, which reduces transport efficiency.

According to the prior art, the waste heat generated during operation of the drive motor is used to heat the truck bed so that the negative effects described above do not occur. This makes it possible to ensure smooth emptying of the truck bed even at temperatures below 0° C., as the truck bed is heated in the region of contact with the working load using the waste heat from the drive motor and prevents parts of the working load from freezing.

In particular, the waste heat can be the exhaust gas of a drive motor that is produced during the operation of an internal combustion engine, e.g. a diesel engine.

In this case, it is particularly complex to create a connection between the front and rear carriages through which the heating medium (exhaust gas) is fed to heat the truck bed. The articulated pivot joint allows a multitude of positions of the front carriage and the rear carriage in relation to each other, so that the implementations known from the prior art are all very complex and prone to wear. The exhaust gas transfer known from the prior art is often based on the sphere-shell principle, in which, for example, a spherical element with a bore serves as the gas outlet, on which a shell is provided that is attached to the sphere and encloses the bore so that as many movements as possible do not interrupt the gas connection of the two components.

The disadvantage of such a connection is that it has a very high wear rate and consequently leads to increased maintenance effort. In addition, significant damage often occurs in the region of the exhaust gas transfer, e.g. if the truck bed tips and the exhaust gas transfer is separated by force. In addition, the implementations for exhaust gas transfer known from the prior art are all complex and have a large number of components that make the production of such an exhaust gas transfer between the front carriage and the rear carriage expensive.

It is the object of the present invention to provide such an exhaust gas transfer between a front carriage and a rear carriage, which are connected to each other via an articulated pivot joint, which no longer exhibits the problems described above or at least mitigates them.

This object is achieved by means of device for transferring exhaust gas, which comprises all the features of claim 1. Advantageous embodiments of the claimed device are specified in the dependent claims. In addition, a mobile working machine having the claimed device is also presented, which is modified in an advantageous manner compared to the mobile working machines known from the prior art, among other things, in order to implement the use of the device for transferring exhaust gas as optimally as possible.

According to the invention, a device is provided for transferring exhaust gas between a front and rear carriage of a mobile working machine, in particular a dump truck, separated by an articulated pivot joint, which working machine has a pipe section, which is variable in it length, for conducting exhaust gas, a first flexible hose cooperating with a first end portion of the pipe section for introducing exhaust gas into the pipe section, and a second flexible hose cooperating with a second end portion of the pipe section for discharging exhaust gas from the pipe section. The device is characterized in that a first cardan shaft is provided in the first end portion, the distal end of which is configured to be rigidly attached to a fastening section of the front carriage or the rear carriage of the working machine, and a second cardan shaft is provided in the second end region, the distal end of which is configured to be rigidly attached to a fastening section of the front carriage or the rear carriage of the working machine, wherein the first hose receives the first cardan shaft and the second hose receives the second cardan shaft.

The invention proposes to arrange the pipe section, which is variable in its length, of the exhaust gas transfer between the front and rear carriages of the mobile working machine with the aid of cardan shafts. For example, one side of the pipe section is attached to the front carriage with the aid of a first cardan shaft and the other side of the pipe section is attached to the rear carriage with the aid of a second cardan shaft. To ensure that the exhaust gas is conducted from the front carriage to the rear carriage (or vice versa) with as little leakage as possible, a first flexible hose is provided that connects the first end of the pipe section to a transfer point for the exhaust gas at the front carriage, and a second flexible hose is provided that connects the second end of the pipe section to a transfer point for the exhaust gas at the rear carriage. The first hose receives the first cardan shaft and the second hose receives the second cardan shaft, so that in a connected state of the device for transferring exhaust gas, exhaust gas passed through the device for transferring exhaust gas flows around the first cardan shaft and the second cardan shaft.

It may be provided that the first cardan shaft is rigidly connected to the first end portion of the pipe section and the second cardan shaft is rigidly connected to the second end portion of the pipe section, or is rigidly arranged at a respective end portion of the pipe section.

According to a development of the present invention, the first hose and the second hose may be a glass-fiber reinforced high-temperature spiral hose that is guided around the respective cardan shafts.

According to an optional modification of the present invention, it can be provided that the first cardan shaft and/or the second cardan shaft is/are a cardan joint or a universal joint. In particular, it can be provided that a first axis of the universal joint or both axes of one of the two cardan shafts is intersected by an articulated axis of the articulated rotation axis.

According to a further development of the present invention, it can be provided that the pipe section, which is variable in its length, comprises two components (e.g. metal pipes) of different diameters, which can be pushed into or out of each other. Accordingly, the pipe section, which is variable in its length, can comprise two pipe components that are connected to each other in the manner of a telescopic extension. A first pipe component has a first diameter and a second pipe component has a reduced diameter compared to the first pipe component, so that the second pipe component can be pushed into and out of the first pipe component.

It can further be provided that the pipe section with a larger diameter has a stop element arranged on the inner circumference, in particular a circumferential ring, and the pipe section with a smaller diameter has a stop element arranged on the outer circumference, in particular a circumferential ring, so that each of the stop elements determine a maximum length of the pipe section, which is variable in its length.

Providing the respective stop elements ensures that after reaching the maximum length of the pipe section, the two pipe components do not separate from each other without further extension.

According to an advantageous modification of the present invention, it can be provided that the pipe section comprises a separating device between the first end region and the second end region, which separating device is configured to separate the pipe section after reaching the maximum length of the pipe section in a controlled manner and a further application of a force in the direction of a further elongation of the pipe section, so that the first end region and the second end region are no longer in connection with each other via a flow channel running through the pipe section.

The separating device causes the pipe section to separate when a corresponding force is applied in the longitudinal direction of the pipe section even when the maximum length of the pipe section has already been reached. The separating device causes the controlled separation of the pipe section and thereby prevents serious and possibly irreversible damage to the device for transferring exhaust gas, which would occur if controlled separation is not possible. In particular, such a case can occur if there is a particularly strong rotation of the front carriage relative to the rear carriage, such as occurs when the rear carriage carrying the truck bed tips relative to the front carriage carrying the driver's cab. According to prior art, the exhaust gas transfer between the front and rear carriage breaks off in an uncontrolled manner, so that after the rear carriage has tipped, smooth continued operation of the mobile working machine is only possible after a visit to the workshop, where the damage to the exhaust gas transfer had to be repaired. This limits the working suitability of the mobile working machine and ties up capacities at the place of use of the mobile working machine.

According to an advantageous design of the present invention, it can be provided that the separating device has two separating rings, which overlap in the longitudinal direction of the pipe section and separate from one another when a force threshold value acting in the longitudinal direction of the pipe section is exceeded.

Accordingly, two rings can be provided that can be separated from each other and that engage with each other, preferably wherein one of the rings is arranged with its inner circumference on the outer circumference of the other ring. It can be provided that the two separating rings are clamped to each other and that the clamping can only be released when a predetermined force acting perpendicular to the surface formed by the rings is exceeded.

Among other things, it can be provided that the first separating ring has a truck bed on its outer contour or its inner contour, and the second separating ring has a compression spring element to engage in the truck bed of the first separating ring, wherein the compression spring preferably has a sphere and a spring element to push the sphere with spring force towards the truck bed of the first separating ring, so that the two separating rings are only connected when a force pulling the two separating rings apart causes the sphere located in the truck bed to be moved against the spring tension and the sphere slides out of the truck bed causing the separating rings to separate.

It can further be provided that the separating device can be reassembled after a separation by a bayonet catch, in particular wherein the truck bed has the typical hook shape of a bayonet guide of the bayonet catch and the compression spring element represents the locking element to be inserted correspondingly into the bayonet guide.

The bayonet catch is therefore embodied by the truck bed in one separating ring and the compression spring element of the other separating ring to be arranged in the truck bed, so that even in the event of an undesired separation of the separating device, the two components separated from each other can be reassembled without tools and without the need for a workshop visit. If, for example, the rear carriage fitted with the truck bed tips, the separating device is triggered to prevent damage to components of the device for transferring exhaust gas. After raising the rear carriage, the operator of the mobile working machine can then reassemble the device for transferring exhaust gas by manually joining the components separated by the separating device without the need for tools.

According to a further development of the present invention, it is provided that the first cardan shaft and/or the second cardan shaft is attached to the pipe section via a connection, in particular a star connection, which emerges from the inner circumference of the associated end portion. The star connection results from the fact that on the inside of the end region, several webs protrude inwards and merge at a point from which the cardan shaft then emerges.

According to a further modification of the present invention, it can be provided that the first hose and/or the second hose is attached to the associated end portion by means of a clamp.

The application by means of a clamp is simple and has been tested a million times, so that a long-lasting and proven connection of the hose to the associated end portion can be carried out in a simple manner.

The invention also relates to a mobile working machine, in particular a construction vehicle such as a dump truck, having a front and rear carriage separated from each other by an articulated pivot joint with an exhaust gas transfer according to any one of the preceding claims for transferring an exhaust gas between the front and rear carriage across the articulated pivot joint, wherein in particular it is provided that the first cardan shaft or the second cardan shaft is arranged directly above the articulated pivot joint.

In particular, it is advantageous if the working machine is configured in such a way that the axis of the articulated joint of the articulated pivot joint intersects or is aligned with an axis of the first or second cardan shaft (in particular universal joint or cardan joint). This is advantageous because it completely eliminates the need for length compensation of the exhaust gas transfer pipe section normally required by steering movements, which has an extremely positive effect on the wear of the device for transferring exhaust gas. Accordingly, a steering lock of the mobile working machine, caused by a kink in the transition from the front carriage to the rear carriage, does not cause any length variation in the pipe section of the exhaust gas transfer, so that a large part of the regular working operation of the mobile working machine does not require any wear-intensive length variation of the pipe section.

Furthermore, according to a development of the present invention, it can be provided that a first fastening section for delivering the exhaust gas to the exhaust gas transfer has an angle of inclination relative to the horizontal in the range of 0-35°, preferably 5-30° and more preferably 15-25°.

It can further be provided that a second fastening section for receiving the exhaust gas from the exhaust gas transfer has an angle of inclination relative to the horizontal in the range of 0-35°, preferably 5-30° and more preferably 15-25°.

In a further development of the present invention, it can be provided that the first fastening section and the second fastening section each have an angle of inclination, which is different in its positive/negative sign compared to an inclination of the horizontal, so that the first fastening section is deflected by +20° compared to the horizontal and the second fastening section is deflected by −20° compared to the horizontal, for example.

According to a further optional modification of the present invention, it can be provided that the first fastening section and/or the second fastening section is rigidly connected in its end portion facing the exhaust gas transfer to the associated cardan shaft via a fastening device, in particular a star connection.

Figure 2:
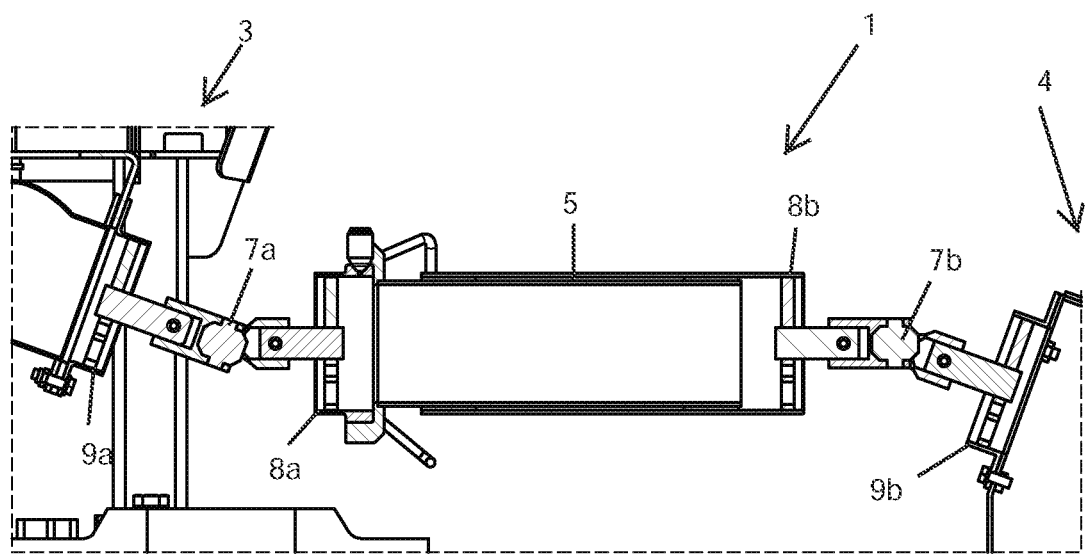
Figure 3:
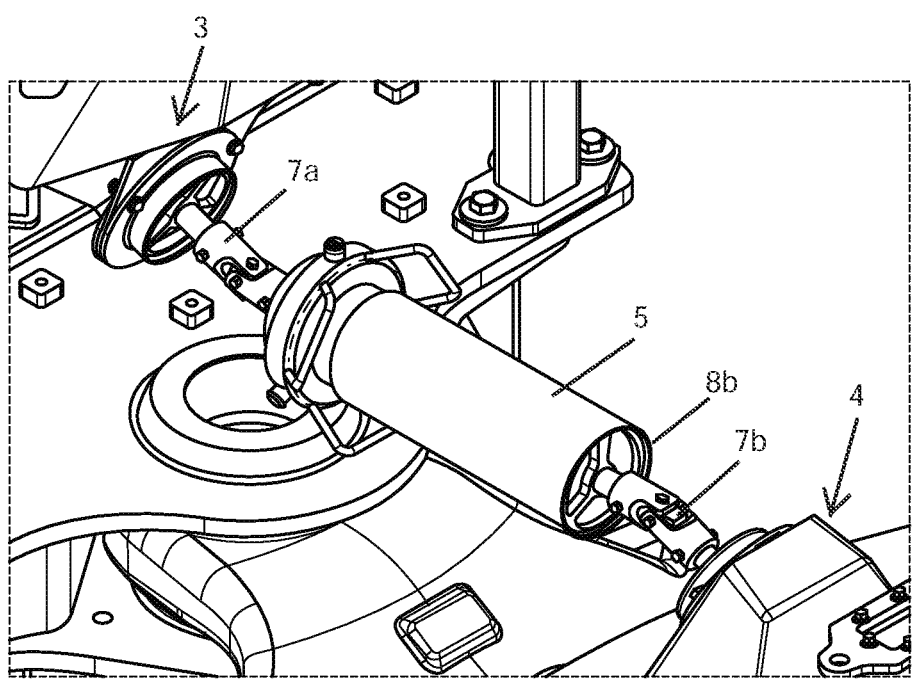
Figure 4A:
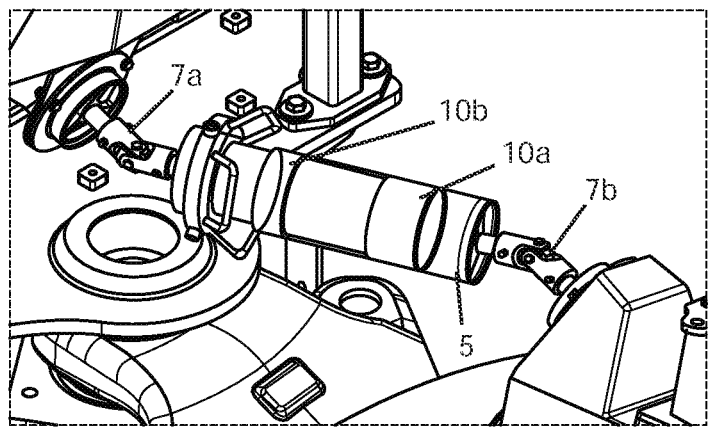
Figure 4B:
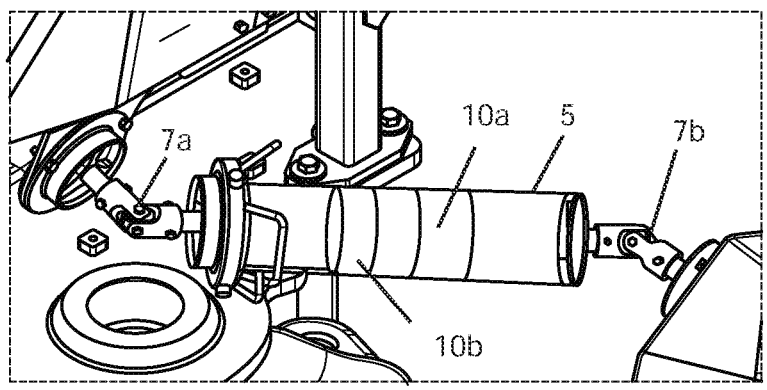
Figure 4C:
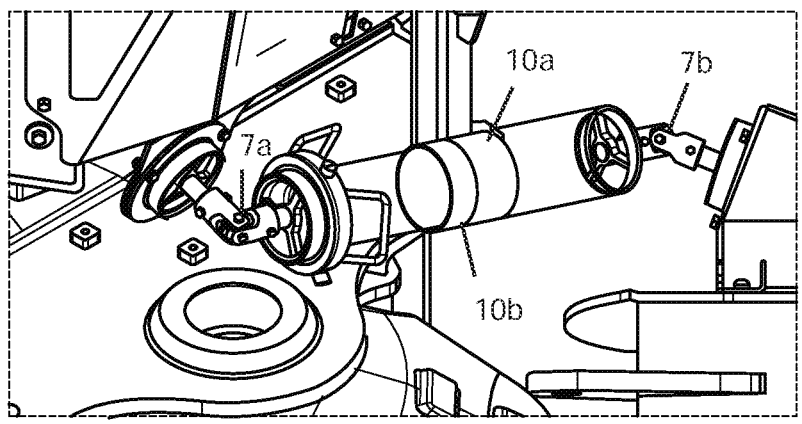
Figure 5:
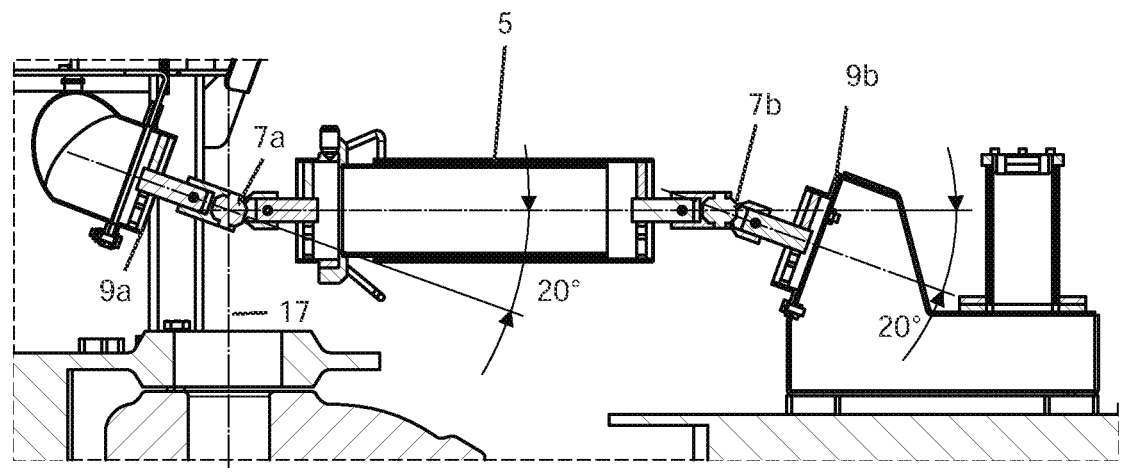
Figure 6:
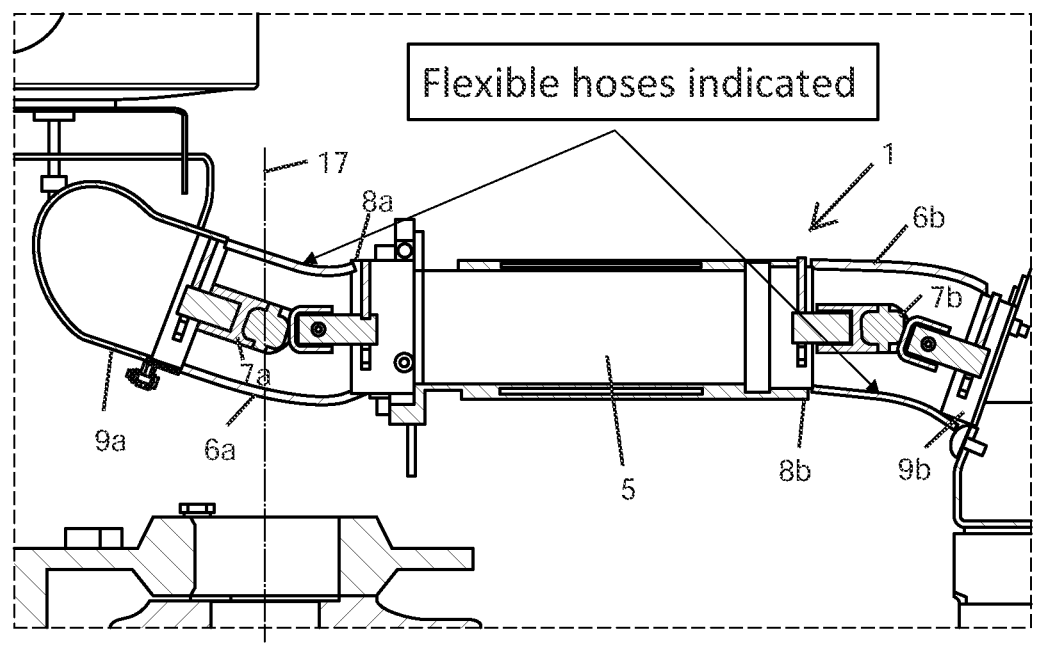
Figure 7:
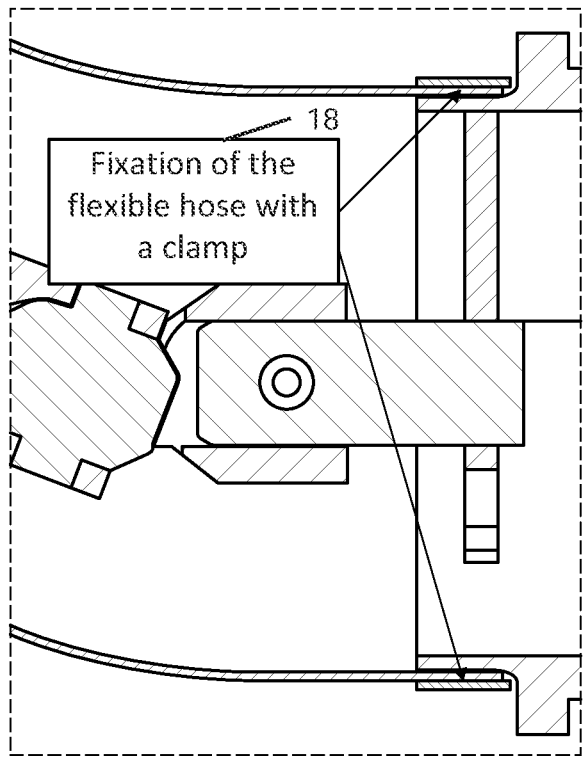
Figure 8:
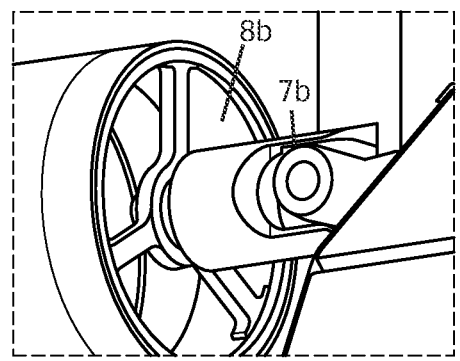
Figure 9A:
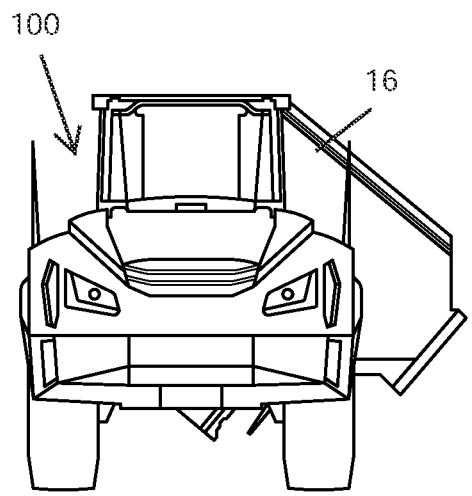
Figure 9B:
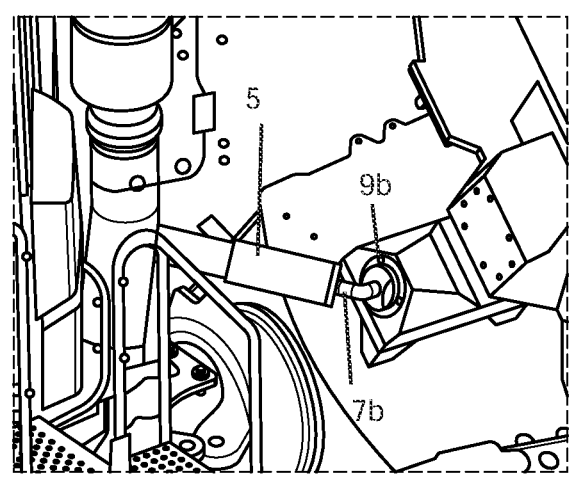
Figure 10:
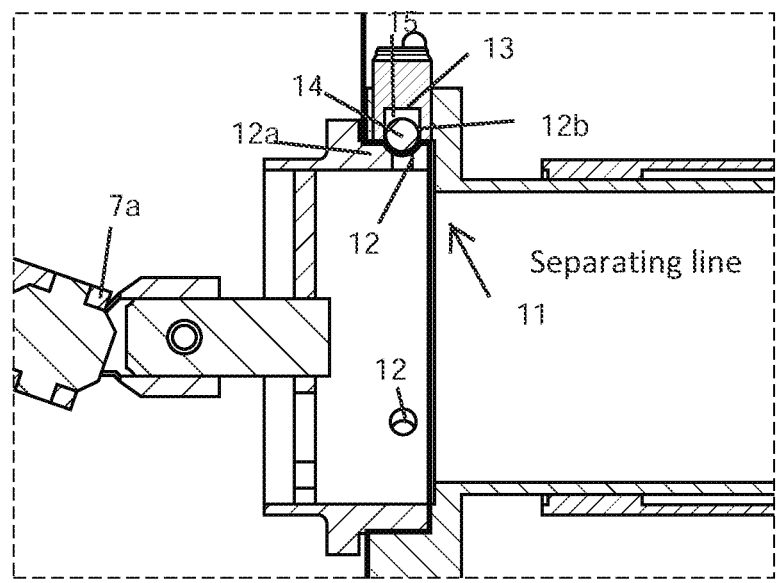
Figure 11:
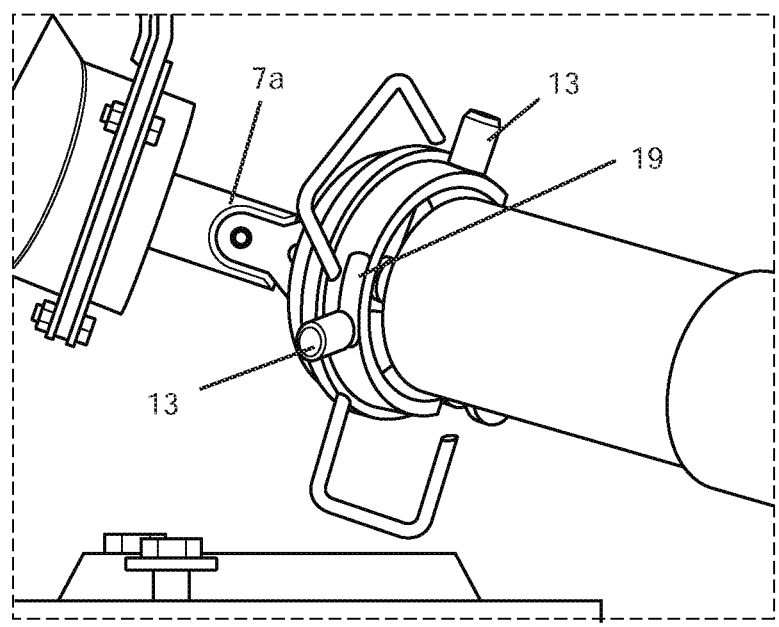

Further details, features and advantages of the invention can be seen in the following description of the figures. In the figures:

FIG. 1: shows a side view of a mobile working machine, which has the device according to the invention for transferring exhaust gas from the front carriage to the rear carriage, FIG. 2: shows a side representation of the device for transferring exhaust gas in a side view, FIG. 3: shows a perspective representation of the device for transferring exhaust gas, FIG. 4a: shows a perspective representation of the device for transferring exhaust gas with the rear carriage slightly rotated in relation to the front carriage, FIG. 4b: shows a perspective representation of the device for transferring exhaust gas with a rear carriage rotated in relation to the front carriage, FIG. 4c: shows a perspective representation of the device for transferring exhaust gas with a rear carriage significantly rotated in relation to the front carriage, FIG. 5: shows a sectional view of the device for transferring exhaust gas together with the corresponding fastening sections on the front and rear carriages, FIG. 6: shows a sectional view of the device for transferring exhaust gas together with a first hose and a second hose for fluidic coupling of the front and rear carriages, FIG. 7: shows a plan view of the first end portion of the pipe section, to which the first hose is attached with a clamp, FIG. 8: shows a perspective representation of an end portion of the pipe section with a star connection for arranging a cardan shaft, FIG. 9a: shows a front view of a mobile working machine in the form of a dump truck body, in which the rear carriage with the truck bed is rotated relative to the front carriage, FIG. 9b: shows a representation of the device for transferring exhaust gas with the rear carriage rotated in relation to the front carriage as shown in FIG. 9a, FIG. 10: shows a sectional view of a separating device for damage-free separation of a fluid connection between the front and rear carriages in the pipe section, and FIG. 11: shows an exploded view of the separating device, which can be reassembled in the manner of a bayonet catch.

FIG. 1 shows a side view of a mobile working machine 100, which has the device 1 according to the invention for transferring exhaust gas from the front carriage 3 to the rear carriage 4. It can be seen that the front carriage 3 is provided with a driver's cab from which an operator can control the mobile working machine 100. The rear carriage 4 is articulated to the front carriage 3 via an articulated pivot joint 2, so that the mobile working machine 100 is steered by an articulated movement of the front carriage 3 relative to the rear carriage 4. In order to absorb different inclinations of the terrain beneath the front carriage 3 or the rear carriage 4, it is also possible to rotate the front carriage 3 in relation to the rear carriage 4 with the aid of the articulated pivot joint 2. The axis about which the rear carriage 4 can be rotated in relation to the front carriage 3 is horizontal and extends in the longitudinal direction of the mobile working machine 100.

In addition, the device 1 for transferring exhaust gas can be seen, which connects the front carriage 3 to the rear carriage 4. Usually, exhaust gas is used to heat the truck bed 16, which is arranged on the rear carriage 4, so that the goods transported in the truck bed do not freeze at low temperatures.

The drive motor for driving the mobile working machine 100 is arranged on the part of the working machine that is spaced apart from the truck bed 16. In other words, this means that, for example, the truck bed 16 is located on the rear carriage 4 and the drive motor is located on the front carriage 3. However, it is clear to a person skilled in the art that a reversed arrangement of the truck bed 16 and the drive motor or driver's cab is also covered by the invention, so that the truck bed can also be arranged on the front carriage 3 and the drive motor can be arranged on the rear carriage 4.

FIG. 2 shows a side representation of the device 1 for transferring exhaust gas in a side view. It can be seen that the device 1 for transferring exhaust gas is arranged between a front carriage 3 and a rear carriage 4.

The first cardan shaft 7a is attached to the front carriage 3 in the region of the first fastening section 9a, which extends towards the first fastening region 8a. The same applies to the rear region of the pipe section 5, where the second cardan shaft 7b emerges from the second fastening region 8b, which is then attached to the second fastening section 9b of the rear carriage 4.

The configuration shown in FIG. 2 does not show the hoses running between the front carriage and the pipe section 5 or between the pipe section 5 and the rear carriage 4, which surround a respective cardan shaft 7a, 7b.

It can be seen that the pipe section 5 comprises two pipe components (e.g. two metal pipe) which are connected to each other in the manner of a telescopic extension. Accordingly, there is a first pipe component, which is smaller in diameter, and a second pipe component, which is arranged coaxially therewith and has a slightly larger diameter, into which the first pipe component is inserted. If a force is now applied that causes the two pipe components that are inserted into each other to be pulled out, a variation in the length of the pipe section 5 occurs.

The maximum length of the pipe section 5 is limited by the fact that the components of the pipe section 5 that are inserted into each other each have a stop element 10a, 10b that, in a state of maximum length of the pipe section 5, abut one another and prevent the pipe components being pulled out further.

FIG. 3 shows a perspective representation of the device 1 for transferring exhaust gas. In the rear region 8b of the pipe section 5, the connection for fastening the second cardan shaft 7b can be seen in the form of a star connection, at the centre of which the cardan shaft 7b emerges. A person skilled in the art is aware that there are a multitude of possible ways of connecting the cardan shaft 7a, 7b at its respective end region of the pipe section 5, so that the implementation shown is only one of many possibilities.

FIGS. 4a to 4c each show a perspective representation of the device for transferring exhaust gas with a rear carriage rotated in relation to the front carriage, wherein the rotation increases more and more from FIG. 4a to FIG. 4c.

In addition, the pipe section 5 is shown transparently so that the stop elements 10a, 10b moving towards each other can be seen until they touch in FIG. 4c and prevent any further addition of length to the pipe section 5. Thus, in FIG. 4a the rear carriage 4 is only slightly rotated, in FIG. 4b it is moderately rotated and in FIG. 4c it is significantly rotated (about 38° to 40°) in relation to the front carriage 3, so that the pipe section 5 is extended to its maximum length. Here the increasing angular change of a respective cardan shaft 7a, 7b can also be seen, as it is required for the respective rotation of the rear carriage 4 in relation to the front carriage 3.

FIG. 5 shows a sectional view of the device 1 for transferring exhaust gas together with the corresponding fastening sections 9a, 9b on the front and rear carriages. Firstly, it can be seen that the exhaust gas is discharged from the front carriage 3 in the region of the first fastening section 9a in such a way that there is an angle of approximately 20° with respect to a horizontal line, which is compensated for with the aid of the first hose 6a (not shown) to the horizontally arranged pipe section 5. It can also be seen that the transfer point to the rear carriage 4 is also deflected with respect to a horizontal line, wherein the deflection corresponds exactly to the angular value as it exists at the front carriage side discharge section of the exhaust gas.

This pre-alignment of the cardan shafts 7a, 7b widens the angle of the direction of movement to such an extent that a large range of all possible movements of the front and rear carriages can be easily covered by the device 1 according to the invention. In this context, it has proven to be advantageous in particular that in the resting state of the vehicle 100 there is a buckling in both drive shafts 7a, 7b, the amount of which is essentially the same.

In addition, the reference numeral 17 indicates the articulation axis of the articulated pivot joint between the front carriage 3 and the rear carriage 4. This runs through the cardan shaft 7A and in particular intersects one of the two axes of the cardan shaft 7a present there. If the discharge of the exhaust gas from the front end were not inclined in the region of the first fastening section 9a, but arranged horizontally like the pipe section 5, the articulation axis 17 of the articulated pivot joint would be advantageously aligned with an axis of the cardan shaft 7a.

FIG. 6 shows a sectional view of the device 1 for transferring exhaust gas together with a first flexible hose 6a and a second flexible hose 6b for fluidic coupling of transfer points of the front carriage 3 and the rear carriage 4. It can be seen that the first flexible hose 6a and the second flexible hose 6b each receive the associated cardan shaft 7a, 7b in their interior.

FIG. 7 shows a plan view of the first end portion of the pipe section 5 in a sectional plane, to which the first hose 6a is attached with a clamp 18. Clamps 18 have been proven to be effective when clamping hose sections to corresponding projections.

FIG. 8 shows a perspective representation of an end portion 8b of the pipe section 5 with a star connection for arranging a cardan shaft 7b. It can be seen that from the inside of the second end portion 8b, a number of sections arranged in a web-like manner with respect to each other project inwards and merge in a center point to which the cardan shaft 7b is attached. It is clear to a person skilled in the art that there are a multitude of further possibilities for connecting the cardan shaft 7b to the second end portion 8b of the pipe section 5, which allow gas to flow around it.

FIG. 9a shows a front view of a mobile working machine in the form of a dump truck, in which the rear carriage with the truck bed is rotated relative to the front carriage. The roll angle of the rear carriage 4 in relation to the front carriage 3, which is still aligned straight, is approximately 38° and can, for example, represent a maximum of the rotation that the device 1 can compensate for without separating the pipe section 5.

FIG. 9b shows a representation of the device for transferring exhaust gas with the rear carriage rotated in relation to the front carriage as shown in FIG. 9a, in which it can be seen the pipe section 5 brought to its maximum longitudinal extension.

FIG. 10 shows a sectional view of a separating device 11 for damage-free separation of a fluid connection between the front and rear carriages in the pipe section 5. The separating device 11 has a first separating ring 12a and a second separating ring 12b, which are operatively connected to each other in such a way that separation by the separating device 11 only occurs when a force is exceeded, which pulls the two pipe components apart.

Thus, a first separating ring 12a can be surrounded on its outer side by a second separating ring 12b, wherein the first separating ring 12a has a truck bed 12 on its outer side into which a compression spring element 13 of the second separating ring 12b engages. This compression spring element 13 may comprise a sphere 14, which, due to a compression spring element 15, protrudes from the second separating ring 12b on its inner side and thus engages in the truck bed 12. This results in a clamping of the two separating rings 12a, 12b, which can only be released when a significant force is exerted. This happens because when the two separating rings 12a, 13a are pulled apart, such a large force is applied that the sphere 14 moves inwards against the force exerted by the spring element 15 and slips out of the truck bed 15. This results in the separation of the two separating rings 12a, 12b, and the fluid connection, which is established by the pipe section 5, is disconnected.

FIG. 11 shows an exploded view of the separating device 11, which can be reassembled in the manner of a bayonet catch. It can be seen that the first separating ring 12*a* has a truck bed 14, which has a specific shape and corresponds to a bayonet guide. Accordingly, it is possible for the compression spring with its inwardly projecting resilient element 13 (the sphere 14) to engage in the guide 19 of the truck bed 14 in the manner of a bayonet catch, thus resulting in a connection of the two separating rings 12*a*, 12*b*. The advantage of this is that no tools are required for the connection and that it is easy to reassemble the connection after it has been separated.

It may further be provided that the first separating ring 12*a* and/or the second separating ring 12*b* is provided with a handle to facilitate manual joining of the two components.

LIST OF REFERENCE NUMERALS

1 Device for transferring exhaust gas
2 Articulated pivot joint
3 Front carriage
4 Rear carriage
5 Pipe section
6*a* First flexible hose
6*b* Second flexible hose
7*a* First cardan shaft
7*b* Second cardan shaft
8*a* First end portion
8*b* Second end portion
9*a* First fastening section (e.g. on the front carriage)
9*b* Second fastening section (e.g. on the rear carriage)
10*a* First stop element
10*b* Second stop element
11 Separating device
12*a* First separating ring
12*b* Second separating ring
12 Truck bed
13 Compression spring element
14 Sphere
15 Spring element
16 Truck bed
17 Axis of rotation of the articulated pivot joint
18 Clamp
19 Bayonet guide
100 Mobile working machine

The invention claimed is:

1. Device for transferring exhaust gas between a front carriage and a rear carriage of a mobile working machine separated by an articulated pivot joint, comprising:
a pipe section, which is variable in its length, to conduct exhaust gas,
a first flexible hose cooperating with a first end portion of the pipe section to introduce exhaust gas into the pipe section, and
a second flexible hose cooperating with a second end portion of the pipe section to discharge exhaust gas from the pipe section,
wherein
a first cardan shaft is provided in the first end portion, the distal end of which is configured to be rigidly attached to a fastening section of the front carriage or the rear carriage of the working machine and
a second cardan shaft is provided in the second end portion, the distal end of which is configured to be rigidly attached to a fastening section of the front carriage or the rear carriage of the working machine, wherein
the first hose receives the first cardan shaft and the second hose receives the second cardan shaft,
wherein the pipe section comprises a separating device between the first end region and the second end region, which separating device is configured to separate the pipe section after reaching the maximum length of the pipe section and a further application of a force in the direction of a further elongation of the pipe section, so that the first end region and the second end region are no longer in connection with each other via a flow channel running through the pipe section.

2. Device according to claim 1, wherein the first cardan shaft and/or the second cardan shaft is a cardan joint or a universal joint.

3. Device according to claim 1, wherein the pipe section, which is variable in its length, comprises two metal pipes of different diameters, which can be pushed into or out of each other.

4. Device according to claim 3, wherein the metal pipe with a smaller diameter has a stop element arranged on the outer circumference, and the metal pipe with a larger diameter has a stop element arranged on the inner circumference, so that each of the stop elements determine a maximum length of the pipe section, which is variable in its length.

5. Device according to claim 1, wherein the separating device has two separating rings, which overlap in the longitudinal direction of the pipe section and separate from one another when a force threshold value acting in the longitudinal direction of the pipe section is exceeded.

6. Device according to claim 5, wherein the first separating ring has a truck bed on its outer contour or its inner contour, and the second separating ring has a compression spring element to engage in the truck bed of the first separating ring, wherein the compression spring has a sphere and a spring element to push the sphere with spring force towards the truck bed of the first separating ring, so that the two separating rings are only connected when a force pulling the two separating rings apart causes the sphere located in the truck bed to be moved against the spring tension and the sphere slides out of the truck bed causing the separating rings to separate.

7. Device according to claim 1, wherein the separating device can be reassembled after a separation by a bayonet catch, wherein the truck bed has a hook shape of a bayonet guide of the bayonet catch and the compression spring element represents the locking element to be inserted correspondingly into the bayonet guide.

8. Device according to claim 1, wherein the first cardan shaft and/or the second cardan shaft is attached to the pipe section via a connection, which emerges from the inner circumference of the associated end portion.

9. Device according to claim 1, wherein the first hose and/or the second hose is attached to the associated end portion by means of a clamp.

10. Mobile working machine having a front and rear carriage separated from each other by an articulated pivot joint with an exhaust gas transfer according to claim 1 for transferring an exhaust gas between the front and rear carriage across the articulated pivot joint, wherein it is provided that the first cardan shaft or the second cardan shaft is arranged directly above the articulated pivot joint.

11. Working machine according to claim 10, wherein a first fastening section for delivering the exhaust gas to the exhaust gas transfer has an angle of inclination relative to the horizontal in the range of 0-35°.

12. Working machine according to claim 11, wherein a second fastening section for receiving the exhaust gas from the exhaust gas transfer has an angle of inclination relative to the horizontal in the range of 0-35°.

13. Working machine according to claim 12, wherein the first fastening section and the second fastening section each have an angle of inclination, which is different in its sign compared to an inclination of the horizontal, so that the first fastening section is deflected by +20° compared to the horizontal and the second fastening section is deflected by −20° compared to the horizontal.

14. Working machine according to claim 12, wherein the first fastening section and/or the second fastening section is rigidly connected in its end portion facing the exhaust gas transfer to the associated cardan shaft via a fastening device.

* * * * *